(12) United States Patent
Nakajima et al.

(10) Patent No.: US 8,259,172 B2
(45) Date of Patent: Sep. 4, 2012

(54) PICTURE SEARCHING APPARATUS

(75) Inventors: Yasuyuki Nakajima, Saitama (JP); Masaru Sugano, Saitama (JP); Hiromasa Yanagihara, Saitama (JP)

(73) Assignee: KDDI Corporation, Tokyo (JP)

( * ) Notice: Subject to any disclaimer, the term of this patent is extended or adjusted under 35 U.S.C. 154(b) by 0 days.

(21) Appl. No.: 13/033,757

(22) Filed: Feb. 24, 2011

(65) Prior Publication Data
US 2011/0142292 A1    Jun. 16, 2011

Related U.S. Application Data

(62) Division of application No. 10/641,025, filed on Aug. 15, 2003, now Pat. No. 7,916,793.

(30) Foreign Application Priority Data

Sep. 20, 2002  (JP) .................................. 2002-275653

(51) Int. Cl.
H04N 7/18 (2006.01)
(52) U.S. Cl. .......... 348/97; 348/101; 348/104; 348/109; 348/699
(58) Field of Classification Search ............ 375/240.01–240.29; 348/96–104, 699–701
See application file for complete search history.

(56) References Cited

U.S. PATENT DOCUMENTS

| | | | |
|---|---|---|---|
| 5,835,163 A * | 11/1998 | Liou et al. ..................... | 348/700 |
| 6,122,322 A | 9/2000 | Jandel | |
| 6,327,390 B1 | 12/2001 | Sun et al. | |
| 6,381,278 B1 | 4/2002 | Shin et al. | |
| 6,473,459 B1 | 10/2002 | Sugano et al. | |
| 6,549,643 B1 * | 4/2003 | Toklu et al. ................... | 382/107 |
| 6,600,784 B1 | 7/2003 | Divakaran et al. | |
| 6,959,044 B1 | 10/2005 | Jin et al. | |

FOREIGN PATENT DOCUMENTS

| | | |
|---|---|---|
| JP | 09-284667 A | 10/1997 |
| JP | 11-177992 A | 7/1999 |
| JP | 11-252509 A | 9/1999 |
| JP | 2001-504656 A | 4/2001 |

OTHER PUBLICATIONS

Japanese Office Action dated Apr. 18, 2007, issued in corresponding Japanese Patent Application No. 2002-275653.

* cited by examiner

Primary Examiner — Andy Rao
(74) Attorney, Agent, or Firm — Westerman, Hattori, Daniels & Adrian, LLP

(57) ABSTRACT

The picture input section 12 fetches image data from the storage device 11, and then, inputs image data on sequential n images into the section 13 for measuring correlation between sequential images and the section 14 for measuring correlation between sampled images. The section 13 for measuring correlation between sequential images measures the correlation between sequential images based on video data. The section 14 for measuring correlation between sampled images measures the correlation between sub-sampled images. The short shot determining section 15 determines short cut points by using the correlation between the sequential images and the correlation between the sub-sampled images. Otherwise, short cut points may be determined in consideration of motion amount between the sequential images or the sub-sampled images.

18 Claims, 10 Drawing Sheets

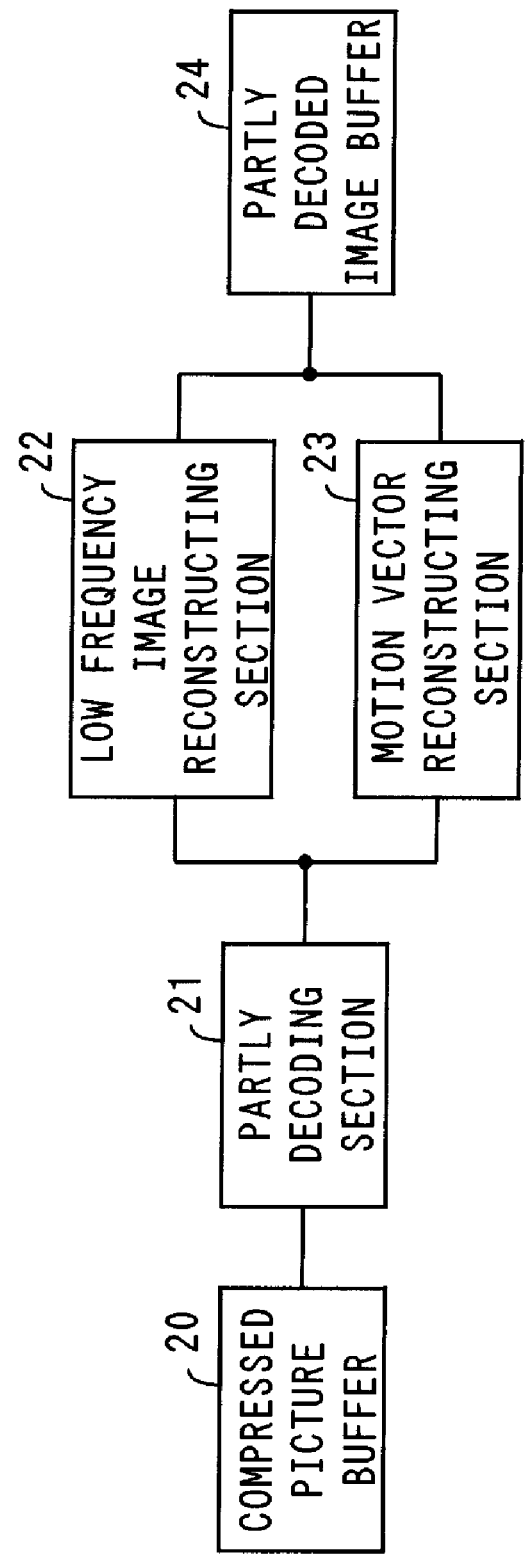

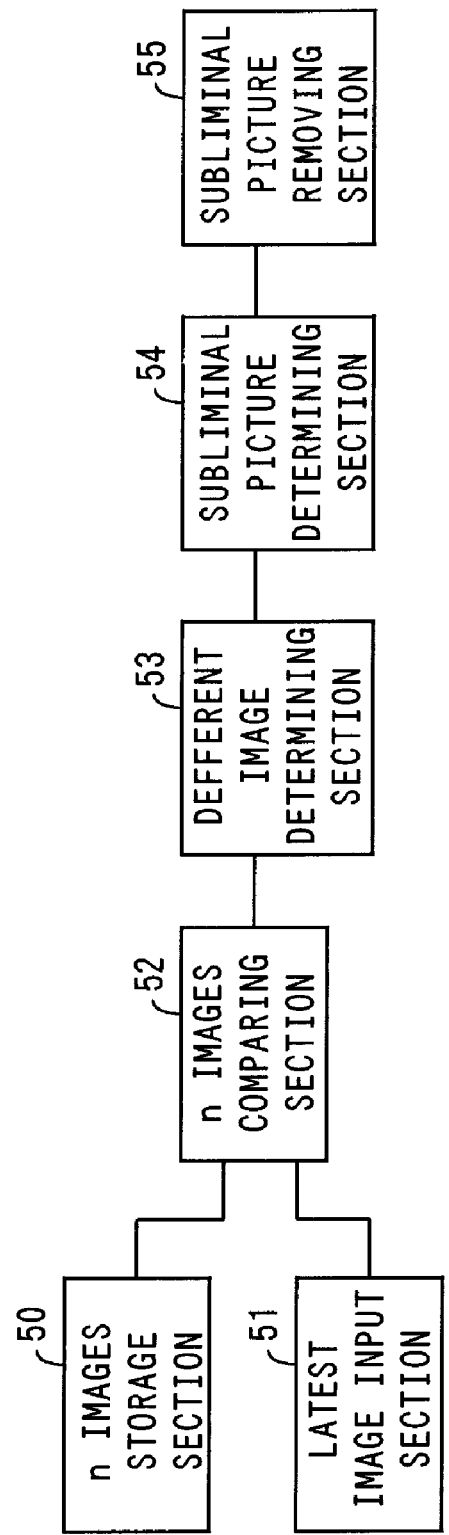

PICTURE SEARCHING APPARATUS

INCORPORATED-BY-REFERENCE TO RELATED APPLICATIONS

This application is a divisional application of U.S. application Ser. No. 10/641,025, filed Aug. 15, 2003, and is based upon and claims the benefit of priority from the prior Japanese Patent Application No. 2002-275653, filed on Sep. 20, 2002, the entire contents of which are incorporated by reference.

BACKGROUND OF THE INVENTION

1. Field of the Invention

The present invention relates to a picture searching apparatus and, more particularly, to a picture searching apparatus capable of efficiently detecting a short shot inserted in video without any error.

2. Description of the Related Art

Japanese Patent Application Laid-Open No. 9-284667 discloses a subliminal picture processor for determining subliminal pictures included in pictures. The subliminal picture processor stores therein sequential image data on n images per image, compares the stored image data on the n images with latest input image data, and then, judges whether or not the stored image data is the same as the latest input image data. The subliminal picture processor determines that if data stored before the data which is judged to be the data on the same image is data which is judged to be data on a different image, images below n frames having image different from images on the preceding and following images are images of subliminal pictures.

FIG. 10 is a block diagram illustrating such the subliminal picture processor. An n images comparing section 52 compares sequential image data of n images output from an n images storage section 50 with latest input image data output from a latest image input section 51, and then, a different image determining section 53 determines whether both of the image data are the same as or different from each other. A subliminal picture determining section 54 determines subliminal pictures based on the determination result by the different image determining section 53. Finally, a subliminal picture removing section 55 removes the image data which is determined as the image data on the subliminal pictures.

In this manner, a conventional technique of detecting a short shot consisting of one frame or several frames inserted in sequential video is to detect the short shot based on the determination whether the latest input image is merely the same as or different from the already input n images.

However, the technique disclosed in Japanese Patent Application Laid-Open No. 9-284667 is to determine the short shot merely based on the comparison result of the latest input image with the already input n images, thereby raising a problem that the short shot inserted in high motion video may be detected with an error, although the short shot inserted in low motion video can be excellently detected.

For example, if motion of an image is not sequential even in the case of one and the same shot, only a part of the image included in one and the same shot may be possibly different from an input image. Therefore, there is a possibility of erroneous detection that the part of the image is a short shot (i.e., a subliminal picture). And, even if motion of video is sequential, it is determined that the latest input image is different from a previous image relatively apart from the latest input image, thereby leading to a possibility that a part of the different image may be erroneously detected as a short shot (i.e., a subliminal picture).

SUMMARY OF THE INVENTION

The present invention has been accomplished in an attempt to solve the above problems observed in the prior art. An object of the present invention is to provide a picture searching apparatus capable of efficiently detecting a short shot inserted in input video without any error.

In order to solve the above-described problems, a first aspect of the present invention is featured in that a picture searching apparatus comprises: means for inputting sequential video data; means for measuring correlation between sequential images based on the video data; means for measuring correlation between sub-sampled images based on the video data; and means for determining short cut points by using the correlation between the sequential images and the correlation between the sub-sampled images.

Furthermore, a second aspect of the present invention is featured in that a picture searching apparatus comprises: means for inputting sequential video data; means for measuring correlation between sequential images based on the video data; means for measuring correlation between sub-sampled images based on the video data; means for measuring motion amount between sequential images based on the video data; and means for determining short cut points by using the correlation between the sequential images, the correlation between the sub-sampled images and the motion amount between the sequential images.

Moreover, a third aspect of the present invention is featured in that a picture searching apparatus comprises: means for inputting sequential video data; means for measuring correlation between sequential images based on the video data; means for measuring correlation between sub-sampled images based on the video data; means for measuring motion amount between sequential images based on the video data; means for measuring motion amount between sub-sampled images based on the video data; and means for determining short cut points by using the correlation between the sequential images, correlation between the sub-sampled images, the motion amount between the sequential images and the motion amount between the sub-sampled images.

Additionally, a fourth aspect of the present invention is featured in that a picture searching apparatus comprises: means for inputting sequential video data; means for measuring correlation between sequential images based on the video data; means for measuring correlation between sub-sampled images based on the video data; means for determining short cut point candidates by using the correlation between the sequential images and the correlation between the sub-sampled images; means for measuring motion amount between sequential images based on the video data with respect to the short cut point candidates; and means for determining short cut points by using the motion amount between the sequential images.

In addition, a fifth aspect of the present invention is featured in that a picture searching apparatus comprises: means for inputting sequential video data; means for measuring motion amount between sequential images based on the video data; means for determining short cut point candidates by using the motion amount between the sequential images; means for measuring correlation between sequential images based on video data with respect to the short cut point candidates; means for measuring correlation between sub-sampled images based on the video data with respect to the short cut point candidates; and means for determining short cut points by using the correlation between the sequential images and the correlation between the sub-sampled images.

Furthermore, a sixth aspect of the present invention is featured in that a picture searching apparatus comprises: means for inputting sequential video data; means for measuring correlation between sequential images based on the video data; means for measuring correlation between sub-sampled images based on video data; means for determining short cut point candidates by using the correlation between the sequential images and the correlation between the sub-sampled images; means for measuring motion amount between sequential images based on the video data with respect to the short cut point candidates; means for measuring motion amount between sub-sampled images based on the video data with respect to the short cut point candidates; and means for determining short cut points by using the motion amount between the sequential images and the motion amount between the sub-sampled images.

Moreover, a seventh aspect of the present invention is featured in that a picture searching apparatus comprises: means for inputting sequential video data; means for measuring motion amount between sequential images based on the video data; means for determining short cut point candidates by using the motion amount between the sequential images; means for measuring correlation between sequential images based on the video data with respect to the short cut point candidates; means for measuring correlation between sub-sampled images based on the video data with respect to the short cut point candidates; means for measuring motion amount between sub-sampled images based on the video data with respect to the short cut point candidates; and means for determining short cut points by using the correlation between the sequential images, the correlation between the sub-sampled images and the motion amount between the sub-sampled images.

Additionally, an eighth aspect of the present invention is featured in that the video data to be input includes a low frequency component of image data.

In addition, a ninth aspect of the present invention is featured in that the video data to be input includes low frequency image data obtained by partly decoding compressed image data and motion vector.

According to the first aspect, short cut points are determined by using correlation between sequential images and correlation between sub-sampled images, so that short shot inserted in video can be efficiently detected without any error.

Furthermore, according to the second and third aspects, short cut points are determined by further using motion amount between sequential images and motion amount between sub-sampled images, thereby more securely preventing erroneous determination even in the case where the image is not sequentially moved in one and the same shot.

Moreover, according to the fourth and sixth aspects, short cut point candidates are determined by using correlation between sequential images and correlation between sub-sampled images, and then, short cut points are determined by measuring motion amount between the sequential images and motion amount between the sub-sampled images with respect to the short cut point candidates limited based on the determination, thereby suppressing the measurement of motion amount of relatively heavy processing to the required minimum.

Additionally, according to the fifth and seventh aspects, short cut point candidates are determined by using motion amount between the sequential images, and then, short cut points are determined by measuring correlation between the sequential images, correlation between sub-sampled images and motion amount between the sub-sampled images with respect to the short cut point candidates limited based on the determination, so that shot of large motion can be first removed, thereby reducing a detecting load as the entire apparatus.

In addition, according to the eighth aspect, short cut points are determined by using the low frequency component of the image data, thereby reducing the processing.

Furthermore, according to the ninth aspect, video data to be input includes the low frequency image data obtained by partly decoding compressed video data and motion vector, thereby reducing the processing by using the low frequency image data, and further, thereby facilitating the measurement by using the motion vector in the case where the processing includes measuring motion amount between the sequential images and motion amount between the sub-sampled images.

BRIEF DESCRIPTION OF THE DRAWINGS

FIG. 9 is a block diagram illustrating a modification of a picture input section; and FIG. 10 is a block diagram illustrating a conventional picture searching apparatus.

DETAILED DESCRIPTION OF THE PREFERRED EMBODIMENTS

Figure 1:
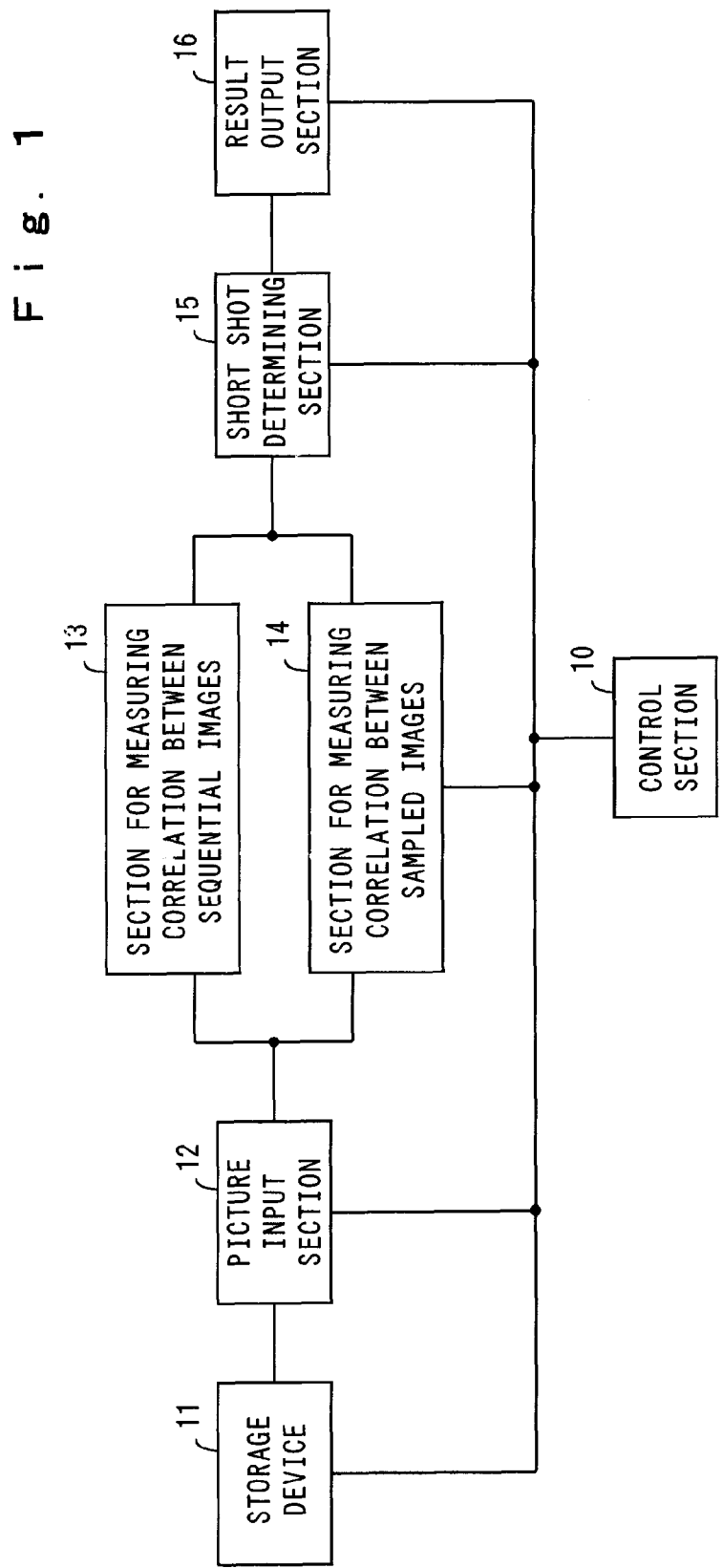
FIG. 1 is a block diagram illustrating a picture searching apparatus in a first embodiment according to the present invention.

The present invention will be described below in detail with reference to the accompanying drawings. FIG. 1 is a block diagram illustrating a picture searching apparatus in a first embodiment according to the present invention. In FIG. 1, a control section 10 controls the operation of the entire picture searching apparatus.

A picture input section 12 fetches image data on a TV program or the like from a storage device 11, and then, inputs image data on sequential n images into a section 13 for measuring correlation between sequential images and a section 14 for measuring correlation between sampled images. Incidentally, this input is repeated while the images are shifted one by one per detection operation of a short shot.

The section 13 for measuring correlation between sequential images measures the correlation $CC(i)$ between sequential two images $P(i-1)$ and $P(i)$, wherein i represents $1, 2, \ldots, n-1$ (hereinafter referred to as "correlation between sequential images"). The section 14 for measuring correlation between sampled images measures correlation SC between sampled images (hereinafter referred to as "correlation between sampled images"). In the case where the sampled images are, for example, a image P(0) and a image P(n−1), the section 14 for measuring correlation between sampled images measures the correlation SC between the image P(0) and the image P(n−1).

Here, the correlation between the sequential images or the correlation between the sampled images can be measured by obtaining or combining any of the sum of luminance absolute differences between images, an average luminance absolute difference between images, an average chrominance absolute difference between images, the sum of luminance histogram absolute differences between images, the sum of chrominance histogram absolute differences between images, a chrominance histogram correlation value between images and the like. The combination is exemplified by the total value of the sum of luminance histogram absolute differences between images and the sum of chrominance histogram absolute differences between images.

The correlation CC(i) between the sequential images output from the section 13 for measuring the correlation between the sequential images and the correlation SC between the sampled images output from the section 14 for measuring correlation between sampled images are input into a short shot determining section 15.

The short shot determining section 15 determines that short cut points exist between the image P(0) and the image P(1) and between the image P(n−2) and the image P(n−1), respectively, so as to detect a short shot section P(1) to P(n−2) in the case where the correlations CC(i) between the sequential images are low when i is 1 and n−1; in contrast, the correlations CC(i) are high when i is neither 1 nor n−1, and the correlation SC between the sampled images is high.

Figure 2:
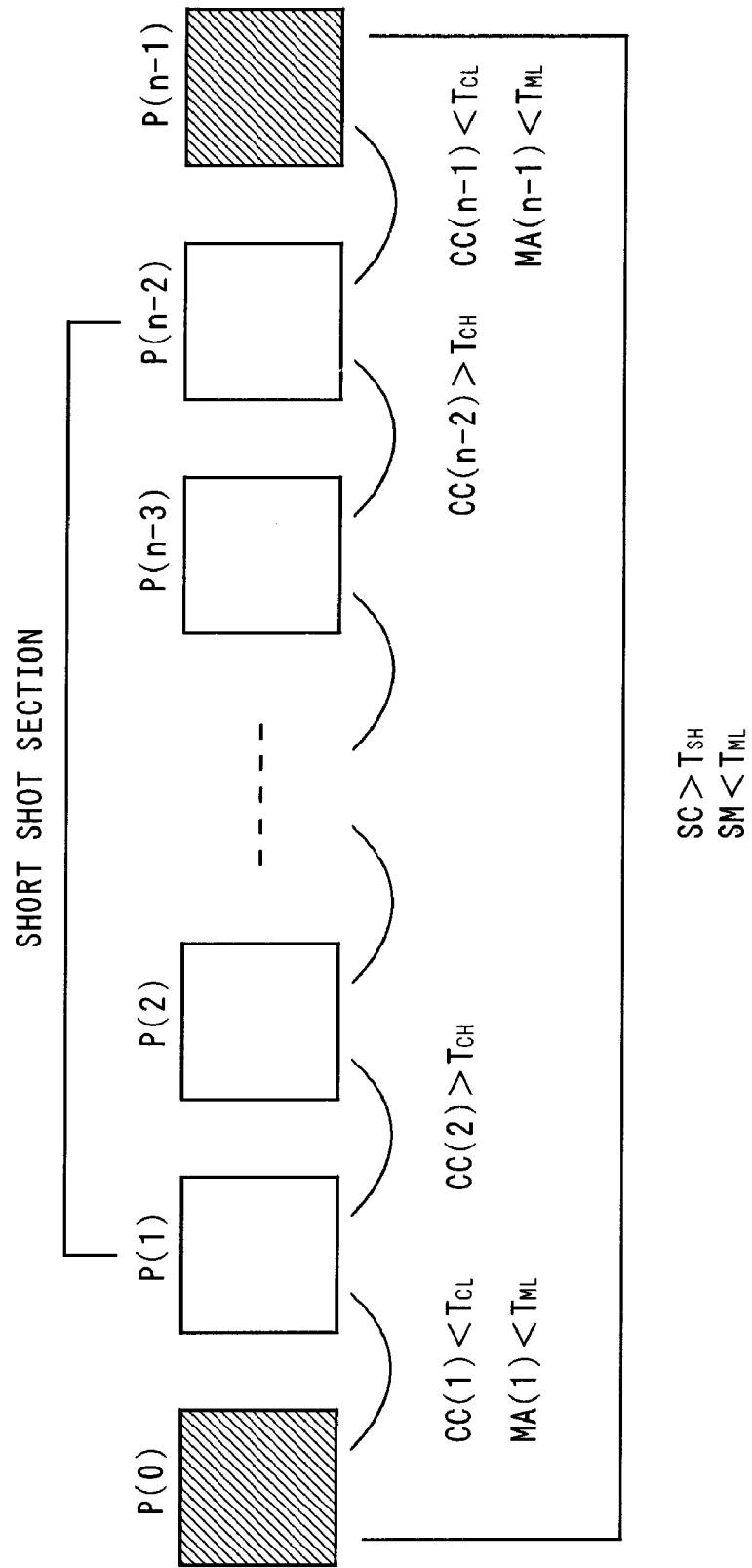
FIG. 2 is an explanatory diagram illustrating the operation of the picture searching apparatus according to the present invention.

The short shot can be determined by threshold processing. FIG. 2 illustrates the state in which CC(1)<$T_{CL}$, CC(n−1)<$T_{CL}$, CC(2) to CC(n−2)>$T_{CH}$ and SC>$T_{SH}$, and further, the short shot section P(1) to P(n−2) is detected on the n images P(0) to P(n−1), wherein $T_{CL}$ represents a threshold of each of the correlations CC(1) and CC(n−1) between the sequential images; $T_{CH}$ represents a threshold of each of other correlations CC(i) between the sequential images; and $T_{SH}$ represents a threshold of the correlation SC between the sampled images. Here, the thresholds $T_{CL}$ and $T_{CH}$ may be the same as or different from each other.

Incidentally, in the case where n=3, it may be determined that a short shot exists when i=1 in the case where the correlations CC(i) between the sequential images are low when i is 1 and 2, and further, the correlation SC between the sampled images is high.

As the sequential n images, n images sampled arbitrarily or periodically in time sequence from sequential N images may be used. The sequential video data according to the present invention includes the above-described video data.

The storage device 11 is not only a storage device previously storing video data therein but also a primary storage device storing therein video data which are sequentially input at real time. Furthermore, images of the video data to be input may be images per frame or field. In the case where images of video data are input per field, only either one of an even field and an odd field may be used.

According to the present invention, short cut points can be determined also in consideration of motion of video. The consideration of motion of video also can securely prevent any erroneous determination in the case where motion of image in one and the same shot is not sequential. Hereinafter, descriptions will be given of several embodiments also in consideration of motion of video. Here, constituent elements identical to or similar to those illustrated in FIG. 1 are designated by the same reference numerals.

Figure 3:
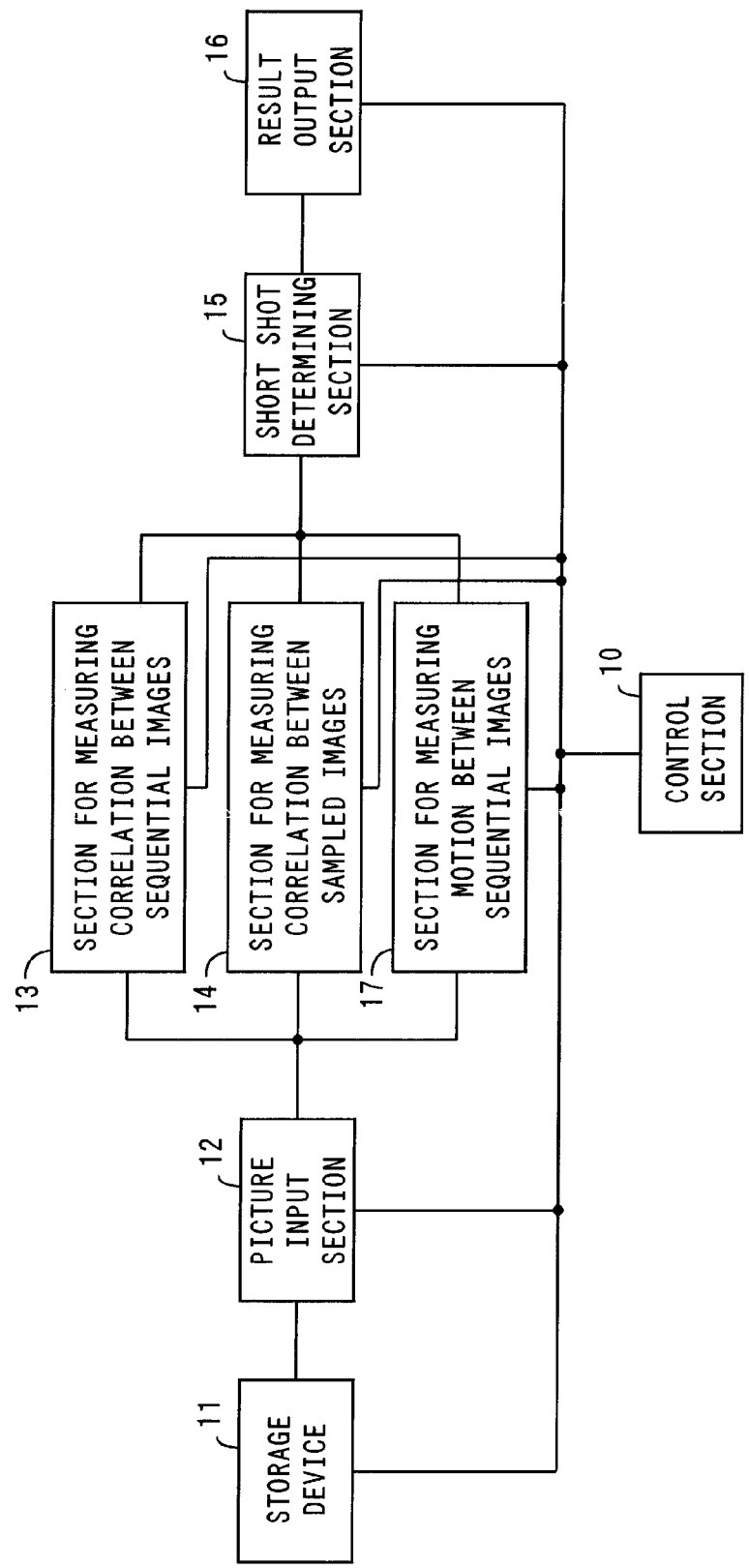
FIG. 3 is a block diagram illustrating a picture searching apparatus in a second embodiment according to the present invention.

FIG. 3 is a block diagram illustrating a picture searching apparatus in a second embodiment according to the present invention. In FIG. 3, the control section 10 controls the operation of the entire picture searching apparatus. The picture input section 12 fetches image data on a TV program or the like from the storage device 11, and then, inputs image data on sequential n images into the section 13 for measuring correlation between sequential images, the section 14 for measuring correlation between sampled images and a section 17 for measuring motion between sequential images.

The section 13 for measuring correlation between sequential images measures the correlation CC(i) between sequential two images P(i−1) and P(i), wherein i represents 1, 2, . . . , n−1. The section 14 for measuring correlation between sampled images measures the correlation SC between sampled images. In the case where the sampled images are, for example, a image P(0) and a image P(n−1), the section 14 for measuring correlation between sampled images measures the correlation SC between the image P(0) and the image P(n−1).

Furthermore, the section 17 for measuring motion between sequential images measures the motion amount MA(i) between the sequential two images P(i−1) and P(i) (hereinafter referred to as "motion amount between sequential images"). As the motion amount MA(i) between the sequential images, an average value of motion vector norms, an average of absolute values of X components and Y components of motion vectors, a statistic value of a deviation of absolute values of X components and Y components of motion vector norms or motion vectors and the like obtained by a block matching method between the sequential images can be used.

The correlation CC(i) between the sequential images output from the section 13 for measuring the correlation between the sequential images, the correlation SC between the sampled images output from the section 14 for measuring correlation between sampled images and the motion amount MA(i) between the sequential images output from the section 17 for measuring motion between sequential images are input into the short shot determining section 15.

The short shot determining section 15 determines that short cut points exist between the image P(0) and the image P(1) and between the image P(n−2) and the image P(n−1), respectively, so as to detect a short shot section P(1) to P(n−2) in the case where the correlations CC(i) between the sequential images are low when i is 1 and n−1; in contrast, the correlations CC(i) are high when i is neither 1 nor n−1, the correlation SC between the sampled images is high and the motion amounts MA(i) between the sequential images are low when i is 1 and n−1. Here, the motion amount between the images is measured to be low between the different images.

The short shot can be determined by threshold processing. FIG. 2 illustrates the state in which CC(1)<$T_{CL}$, CC(n−1)<$T_{CL}$, CC(2) to CC(n−2)>$T_{CH}$, SC>$T_{SH}$, and MA(1)<$T_{ML}$ and MA(n−1)<$T_{ML}$, and further, the short shot section P(1) to P(n−2) is detected on the n images P(0) to P(n−1), wherein $T_{CL}$ represents a threshold of each of the correlations CC(1) and CC(n−1) between the sequential images; $T_{CH}$ represents a threshold of each of other correlations CC(i) between the sequential images; $T_{SH}$ represents a threshold of the correlation SC between the sampled images; and $T_{ML}$ represents a threshold of the motion amount MA(i) between the sequential images.

Incidentally, in the case where n=3, it may be determined that a short shot exists when i=1 in the case where the correlations CC(i) between the sequential images are low when i is 1 and 2, the correlation SC between the sampled images is high, and further, the motion amounts MA(i) between the sequential images are low when i is 1 and 2.

Figure 4:
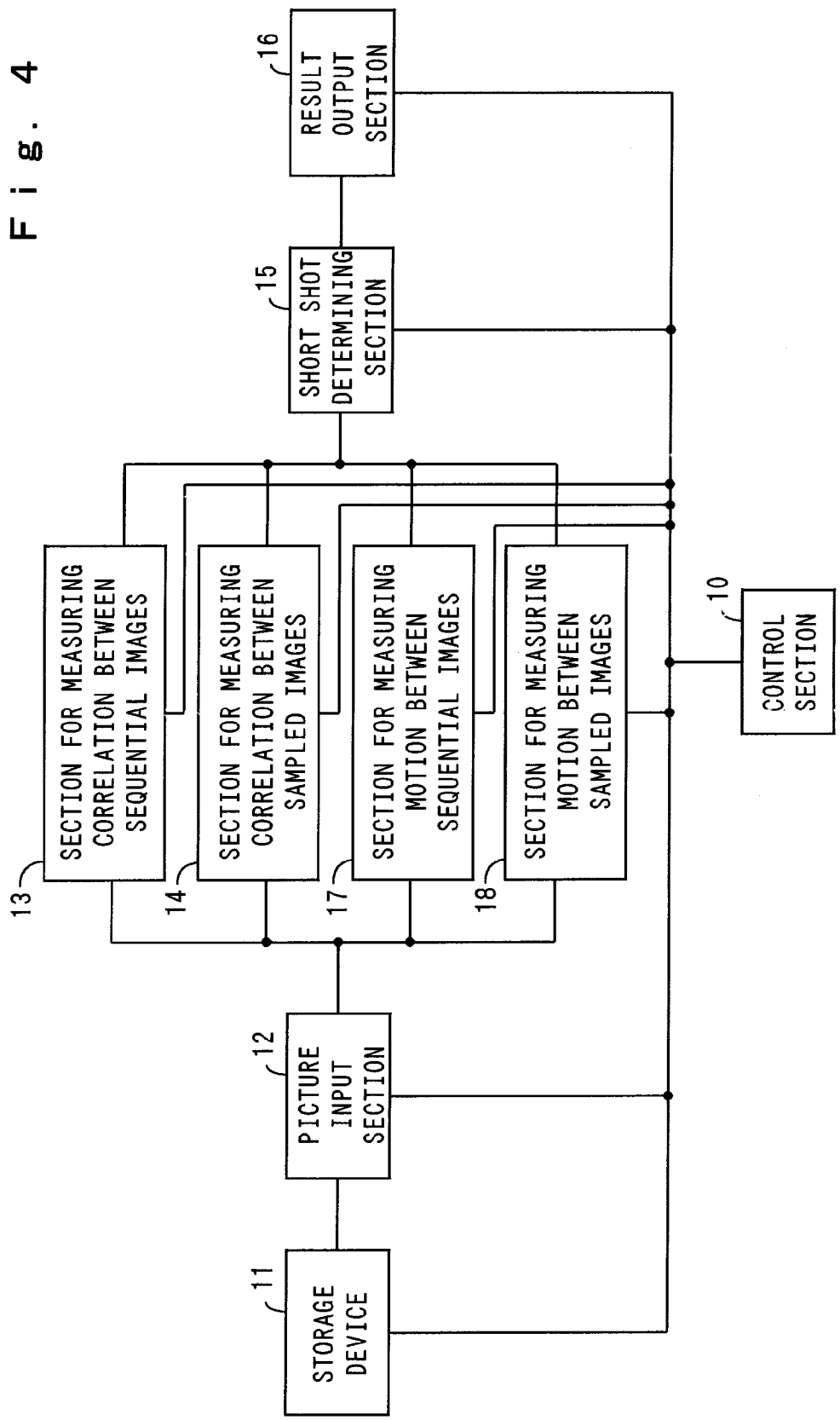
FIG. 4 is a block diagram illustrating a picture searching apparatus in a third embodiment according to the present invention.

FIG. 4 is a block diagram illustrating a picture searching apparatus in a third embodiment according to the present invention. In FIG. 4, the control section 10 controls the operation of the entire picture searching apparatus. The picture input section 12 fetches image data on a TV program or the like from the storage device 11, and then, inputs image data on sequential n images into the section 13 for measuring correlation between sequential images, the section 14 for measuring correlation between sampled images, the section 17 for measuring motion between sequential images and a section 18 for measuring motion between sampled images.

The section 13 for measuring correlation between sequential images measures the correlation CC(i) between sequential two images P(i−1) and P(i), wherein i represents 1, 2, ..., n−1. The section 14 for measuring correlation between sampled images measures the correlation SC between sampled images. In the case where the sampled images are, for example, a image P(0) and a image P(n−1), the section 14 for measuring correlation between sampled images measures the correlation SC between the image P(0) and the image P(n−1).

The section 17 for measuring motion between sequential images measures the motion amount MA(i) between the sequential two images P(i−1) and P(i). Furthermore, the section 18 for measuring motion between sampled images measures the motion amount SM between the sampled images (hereinafter referred to as "motion amount between sampled images"). Here, a sampled image in the section 18 for measuring motion between sampled images is the same as that in the section 14 for measuring correlation between sampled images. The section 18 for measuring motion between sampled images obtains the motion amount SM between the images by using the image P(0) and the image P(n−1) as samples.

The correlation CC(i) between the sequential images output from the section 13 for measuring the correlation between the sequential images, the correlation SC between the sampled images output from the section 14 for measuring correlation between sampled images, the motion amount MA(i) between the sequential images output from the section 17 for measuring motion between sequential images and the motion amount SM between the sampled images output from the section 18 for measuring motion between sampled images are input into the short shot determining section 15.

The short shot determining section 15 determines that short cut points exist between the image P(0) and the image P(1) and between the image P(n−2) and the image P(n−1), respectively, so as to detect a short shot section P(1) to P(n−2) in the case where the correlations CC(i) between the sequential images are low when i is 1 and n−1; in contrast, the correlations CC(i) are high when i is neither 1 nor n−1, the correlation SC between the sampled images is high, the motion amounts MA(i) between the sequential images are low when i is 1 and n−1 and the motion amount SM between the sampled images is low.

The short shot can be determined by threshold processing. FIG. 2 illustrates the state in which $CC(1) < T_{CL}$, $CC(n-1) < T_{CL}$, $CC(2)$ to $CC(n-2) > T_{CH}$, $SC > T_{SH}$, $MA(1) < T_{ML}$, $MA(n-1) < T_{ML}$ and $SM < T_{ML}$, and further, the short shot section P(1) to P(n−2) is detected on the n images P(0) to P(n−1), wherein $T_{CL}$ represents a threshold of each of the correlations CC(1) and CC(n−1) between the sequential images; $T_{CH}$ represents a threshold of each of other correlations CC(i) between the sequential images; $T_{SH}$ represents a threshold of the correlation SC between the sampled images; and $T_{ML}$ represents a threshold of each of the motion amount MA(i) between the sequential images and the motion amount SM between the sampled images.

Figure 5:
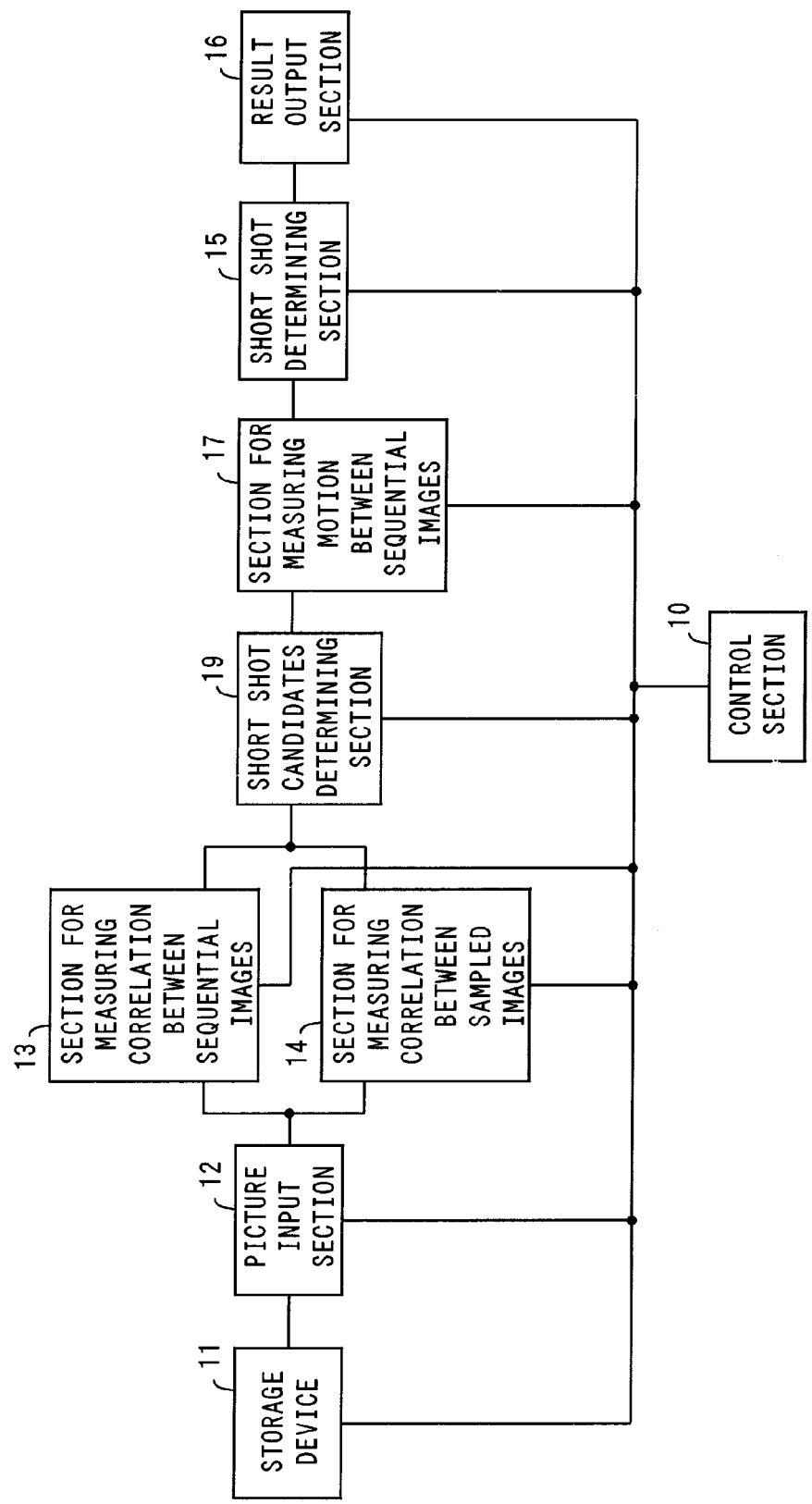
FIG. 5 is a block diagram illustrating a picture searching apparatus in a fourth embodiment according to the present invention.

FIG. 5 is a block diagram illustrating a picture searching apparatus in a fourth embodiment according to the present invention. In FIG. 5, the control section 10 controls the operation of the entire picture searching apparatus. The picture input section 12 fetches image data on a TV program or the like from the storage device 11, and then, inputs image data on sequential n images into the section 13 for measuring correlation between sequential images and the section 14 for measuring correlation between sampled images.

The section 13 for measuring correlation between sequential images measures the correlation CC(i) between sequential two images P(i−1) and P(i), wherein i represents 1, 2, ..., n−1. The section 14 for measuring correlation between sampled images measures the correlation SC between sampled images. In the case where the sampled images are, for example, a image P(0) and a image P(n−1), the section 14 for measuring correlation between sampled images measures the correlation SC between the image P(0) and the image P(n−1).

The correlation CC(i) between the sequential images output from the section 13 for measuring the correlation between the sequential images and the correlation SC between the sampled images output from the section 14 for measuring correlation between sampled images are input into short shot candidates determining section 19.

The short shot candidates determining section 19 determine that short shot candidates exist between where i is 1 and i is n−2 in the case where the correlations CC(i) between the sequential images are low when i is 1 and n−1; in contrast, the correlations CC(i) are high when i is neither 1 nor n−1 and the correlation SC between the sampled images is high.

Subsequently, the section 17 for measuring motion between sequential images measures motion amount MA(i) between the sequential images with respect to n images P(0) to P(n−1) including the images P(1) to P(n−2) in which short shot candidates are determined to exist. The motion amount MA(i) between the sequential images output from the section 17 for measuring motion between sequential images is input into the short shot determining section 15.

The short shot determining section 15 determines that short cut points exist between the image P(0) and the image P(1) and between the image P(n−2) and the image P(n−1), respectively, so as to detect a short shot section P(1) to P(n−2) in the case where the motion amounts MA(i) between the sequential images are low when i is 1 and n−1.

In the embodiment illustrated in FIG. 5, the motion amount between the sequential images is measured after the correlation between the sequential images and the correlation between the sampled images are measured. With this constitution, it is enough to measure the motion amount between the sequential images with respect to only short cut point candidates. Thus, it is possible to suppress the measurement of motion amount to the required minimum.

Figure 6:
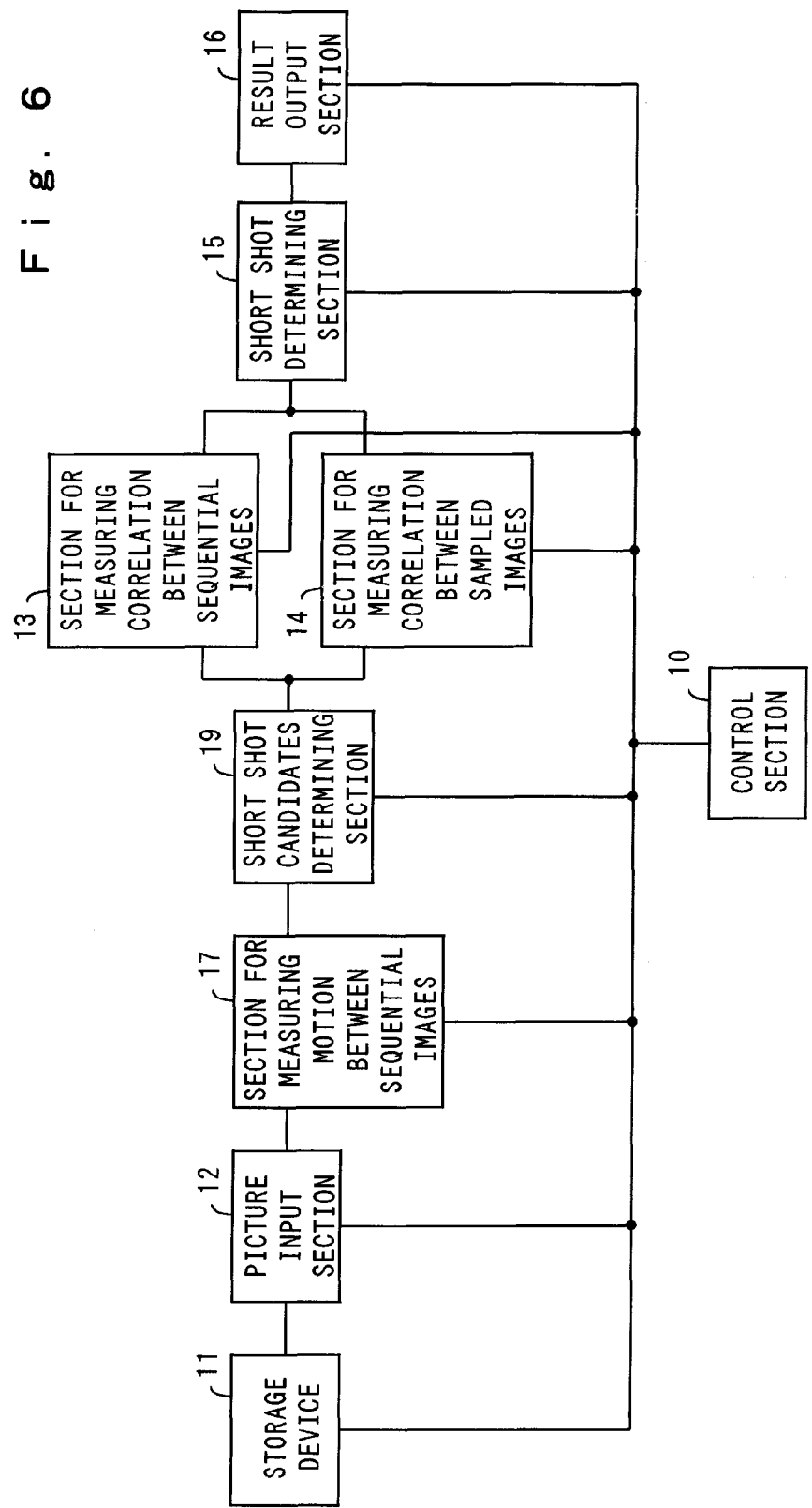
FIG. 6 is a block diagram illustrating a modification of the fourth embodiment (that is, a fifth embodiment)

FIG. 6 illustrates a fifth embodiment as a modification, in which the processing order illustrated in FIG. 5 is reversed. In the embodiment illustrated in FIG. 6, input video data is first input into the section 17 for measuring motion between sequential images, in which the motion amount MA(i) between sequential images is measured. Next, the measured motion amount MA(i) between the sequential images is input into short shot candidates determining section 19, in which images P(1) to P(n−2) are detected as short shot candidates.

Subsequently, image data on n images P(0) to P(n−1) including the images P(1) to P(n−2) in which short shot candidates are determined to exist is input into the section 13 for measuring correlation between sequential images and the section 14 for measuring correlation between sampled images. The correlation CC(i) between the images output from the section 13 for measuring the correlation between the sequential images and the correlation SC between the sampled images output from the section 14 for measuring correlation between sampled images are input into the short shot determining section 15. The short shot determining section 15 determines that short cut points exist between the image P(0) and the image P(1) and between the image P(n−2) and the image P(n−1), respectively, so as to detect a short shot section P(1) to P(n−2).

In the embodiment illustrated in FIG. 6, shots of a large motion are first removed, and therefore, the correlation between the images need not be measured with respect to the shots of a large motion, thereby reducing a detecting load as the entire apparatus.

Figure 7:
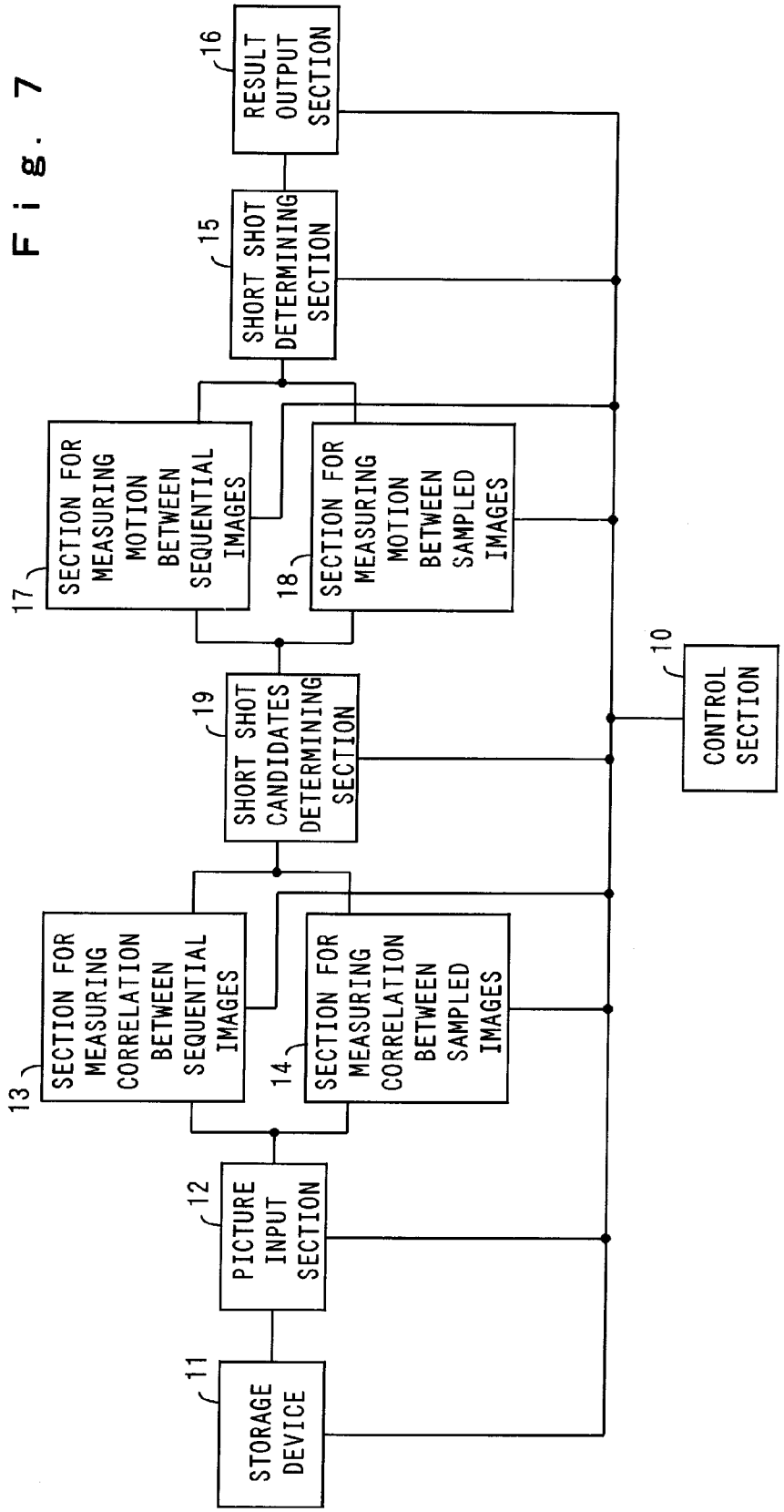
FIG. 7 is a block diagram illustrating a picture searching apparatus in a sixth embodiment according to the present invention.

FIG. 7 is a block diagram illustrating a picture searching apparatus in a sixth embodiment according to the present invention. In FIG. 7, the control section 10 controls the operation of the entire picture searching apparatus. The picture input section 12 fetches image data on a TV program or the like from the storage device 11, and then, inputs image data on sequential n images into the section 13 for measuring correlation between sequential images and the section 14 for measuring correlation between sampled images.

The section 13 for measuring correlation between sequential images measures the correlation CC(i) between sequential two images P(i−1) and P(i), wherein i represents 1, 2, . . . , n−1. The section 14 for measuring correlation between sampled images measures the correlation SC between sampled images. In the case where the sampled images are, for example, a image P(0) and a image P(n−1), the section 14 for measuring correlation between sampled images measures the correlation SC between the image P(0) and the image P(n−1).

The correlation CC(i) between the sequential images output from the section 13 for measuring the correlation between the sequential images and the correlation SC between the sampled images output from the section 14 for measuring correlation between sampled images are input into short shot candidates determining section 19.

The short shot candidates determining section 19 determines that short shot candidates exist between where i is 1 and i is n−2 in the case where the correlations CC(i) between the sequential images are low when i is 1 and n−1; in contrast, the correlations CC(i) are high when i is neither 1 nor n−1 and the correlation SC between the sampled images is high.

Subsequently, image data on n images P(0) to P(n−1) including the images P(1) to P(n−2) in which short shot candidates are determined to exist is input into the section 17 for measuring motion between sequential images and the section 18 for measuring motion between sampled images. The motion amount MA(i) between the sequential images output from the section 17 for measuring motion between sequential images and the motion amount SM between the sampled images output from the section 18 for measuring motion between sampled images are input into the short shot determining section 15. The short shot determining section 15 determines that short cut points exist between the image P(0) and the image P(1) and between the image P(n−2) and the image P(n−1), respectively, so as to detect a short shot section P(1) to P(n−2) in the case where the motion amounts MA(i) between the sequential images are low when i is 1 and n−1 and the motion amount SM between the sampled images is low.

Figure 8:
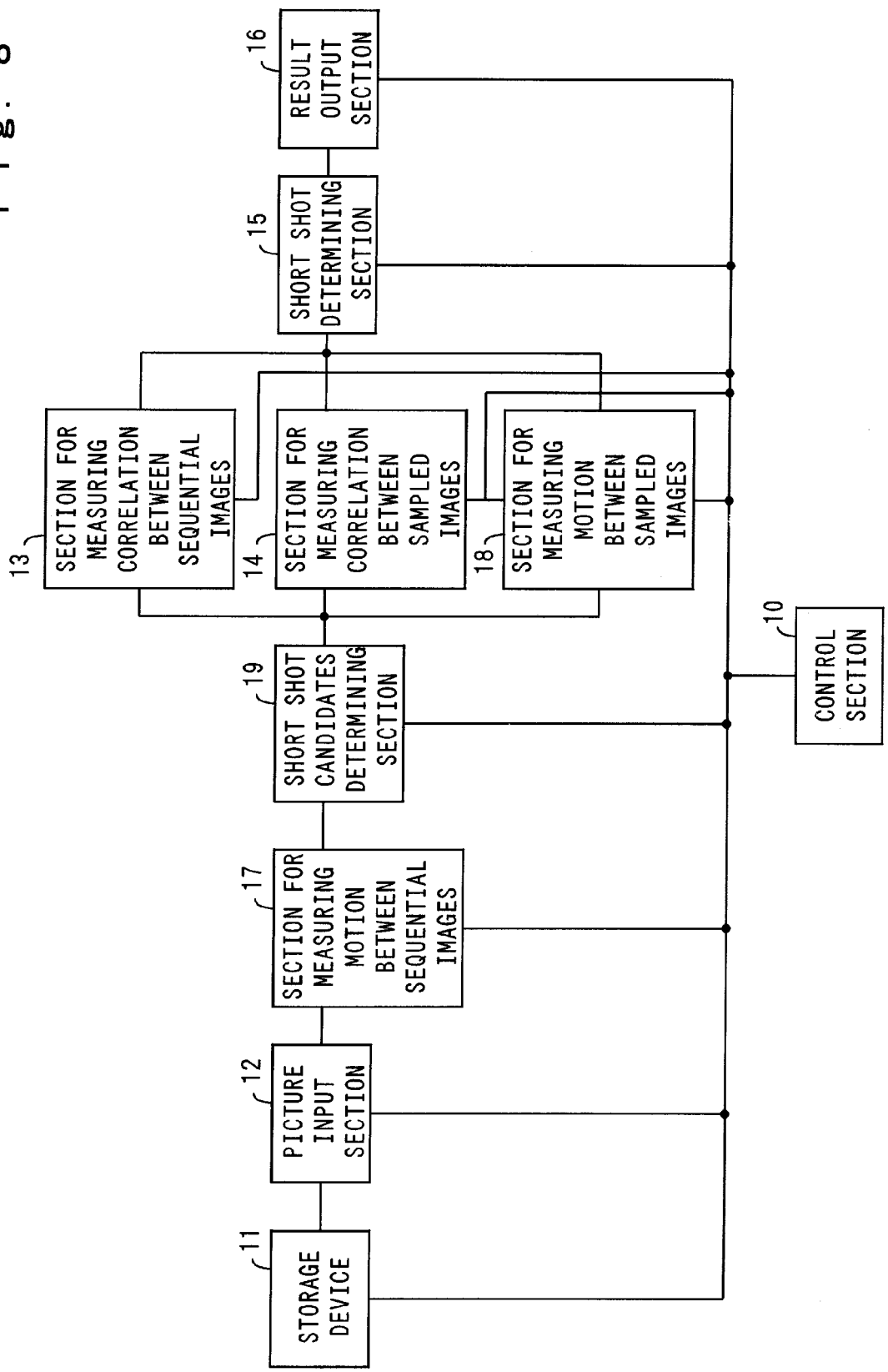
FIG. 8 is a block diagram illustrating a modification of the fifth embodiment (that is, a seventh embodiment)

FIG. 8 illustrates a seventh embodiment as a modification of the embodiment illustrated in FIG. 7. In the seventh embodiment, the motion amount MA(i) between sequential images of an input picture is first measured by the section 17 for measuring motion between sequential images, and then, is input into short shot candidates determining section 19, in which short shot candidates are determined Subsequently, image data on n images P(0) to P(n−1) including the images P(1) to P(n−2) in which short shot candidates are determined to exist is input into the section 13 for measuring correlation between sequential images, the section 14 for measuring correlation between sampled images and the section 18 for measuring motion between sampled images. The correlation CC(i) between the images output from the section 13 for measuring the correlation between the sequential images, the correlation SC between the sampled images output from the section 14 for measuring correlation between sampled images and the motion amount SM between the sampled images output from the section 18 for measuring motion between sampled images are input into the short shot determining section 15, which then determines a short shot.

Although the description has been given of the examples in which the short shot section P(1) to P(n−2) is detected among the sequential n images P(0) to P(n−1), short shots having various lengths can be detected by appropriately setting the number n of images to be processed. Moreover, if the correlations between images or motion amounts between images of sampled images at various image intervals are measured in parallel, short shots having various lengths can be detected at the same time. In this case, correlations between sequential images or motion amounts between sequential images is sufficiently measured only once.

Although the embodiments according to the present invention have been described above, the present invention can be variously modified. For example, the picture input section 12 can receive compressed data, and then, output partly decoded information.

FIG. 9 illustrates an example of partly decoding processing which can be used in the picture input section 12. In this example, compressed picture data is primarily stored in a compressed picture buffer 20, and thereafter, the compressed picture data is partly decoded by a partly decoding section 21. For example, in the case of picture data subjected to MPEG encoding, the partly decoding processing signifies the processing of extracting a DCT coefficient and information on motion vector.

Such information is input into a low frequency image reconstructing section 22 and motion vector reconstructing section 23. The low frequency image reconstructing section 22 produces a low frequency component image based on the partly decoded data. For example, only a zero-order or low-order coefficient among the DCT coefficients is subjected to reverse DCT, whereby a low frequency component can be output. Otherwise, in the case of compressed data subjected to motion compensation and prediction encoding, simple motion compensation is performed by extracted motion vector, so that a low frequency image is reconstructed, as proposed by "a method for detecting a cut image of a video" disclosed in Japanese Patent Application Laid-Open No. 7-59108.

The motion vector reconstructing section 23 reconstructs the motion vector information based on the motion vector information output from the partly decoding section 21. Furthermore, the size of the vector can be changed according to the size of the image when the size of the image is changed in the case where the low frequency image is used. These partly reconstructed image and motion vector are stored in a partly decoded image buffer 24, in which the motion vector can be used in measuring motion amount between sequential images or motion amount between sampled images.

As described above, according to the present invention, the short shot can be efficiently detected without any error by using correlation between sequential images and correlation between sampled images. Additionally, the erroneous determination can be more securely prevented even in the case where motion of image in one and the same shot is not sequential also by using motion amount between the sequential images and motion amount between the sampled images.

In addition, it is possible to reduce the processing load by selecting short shot candidates, so as to first limit short shot candidates, and then, to measure the correlation or motion amount in the limited short shot candidates.

What is claimed is:

1. A picture searching apparatus comprising:
   means for inputting sequential video data;
   means for measuring correlation between sequential images based on the video data;
   means for directly measuring correlation between only non-sequential temporally sub-sampled images with a frame or field as a unit based on the video data;
   means for measuring motion amount between sequential images based on the video data; and
   means for determining short cut points by using the correlation between the sequential images, the correlation between the non-sequential temporally sub-sampled images and the motion amount between the sequential images,
   wherein the means for measuring correlation between sequential images and the means for directly measuring correlation between only non-sequential temporally sub-sampled images operate independently from each other.

2. A picture searching apparatus comprising:
   means for inputting sequential video data;
   means for measuring correlation between sequential images based on the video data;
   means for directly measuring correlation between only non-sequential temporally sub-sampled images with a frame or field as a unit based on the video data;
   means for measuring motion amount between sequential images based on the video data;
   means for measuring motion amount between the non-sequential temporally sub-sampled images with a frame or field as a unit based on the video data; and
   means for determining short cut points by using the correlation between the sequential images, the correlation between the non-sequential temporally sub-sampled images, the motion amount between the sequential images and the motion amount between the non-sequential temporally sub-sampled images,
   wherein the means for measuring correlation between sequential images and the means for directly measuring correlation between only non-sequential temporally sub-sampled images operate independently from each other.

3. A picture searching apparatus comprising:
   means for inputting sequential video data;
   means for measuring correlation between sequential images based on the video data;
   means for directly measuring correlation between only non-sequential temporally sub-sampled images with a frame or field as a unit based on the video data;
   means for determining short cut point candidates by using the correlation between the sequential images and the correlation between the non-sequential temporally sub-sampled images;
   means for measuring motion amount between sequential images based on the video data with respect to the short cut point candidates; and
   means for determining short cut points by using the motion amount between the sequential images,
   wherein the means for measuring correlation between sequential images and the means for directly measuring correlation between only non-sequential temporally sub-sampled images operate independently from each other.

4. A picture searching apparatus comprising:
   means for inputting sequential video data;
   means for measuring motion amount between sequential images based on the video data;
   means for determining short cut point candidates by using the motion amount between the sequential images;
   means for measuring correlation between sequential images based on the video data with respect to the short cut point candidates;
   means for directly measuring correlation between only non-sequential temporally sub-sampled images with a frame or field as a unit based on the video data with respect to the short cut point candidates; and
   means for determining short cut points by using the correlation between the sequential images and the correlation between the non-sequential temporally sub-sampled images,
   wherein the means for measuring correlation between sequential images and the means for directly measuring correlation between only non-sequential temporally sub-sampled images operate independently from each other.

5. A picture searching apparatus comprising:
   means for inputting sequential video data;
   means for measuring correlation between sequential images based on the video data;
   means for directly measuring correlation between only non-sequential temporally sub-sampled images with a frame or field as a unit based on the video data;
   means for determining short cut point candidates by using the correlation between the sequential images and the correlation between the non-sequential temporally sub-sampled images;
   means for measuring motion amount between sequential images based on the video data with respect to the short cut point candidates;
   means for measuring motion amount between non-sequential temporally sub-sampled images with a frame or field as a unit based on the video data with respect to the short cut point candidates; and
   means for determining short cut points by using the motion amount between the sequential images and the motion amount between the non-sequential temporally sub-sampled images,
   wherein the means for measuring correlation between sequential images and the means for directly measuring correlation between only non-sequential temporally sub-sampled images operate independently from each other.

6. A picture searching apparatus comprising:
   means for inputting sequential video data;
   means for measuring motion amount between sequential images based on the video data;
   means for determining short cut point candidates by using the motion amount between the sequential images;
   means for measuring correlation between sequential images based on the video data with respect to the short cut point candidates;
   means for directly measuring correlation between only non-sequential temporally sub-sampled images with a frame or field as a unit based on the video data with respect to the short cut point candidates;
   means for measuring motion amount between the only non-sequential temporally sub-sampled images with a frame or field as a unit based on the video data with respect to the short cut point candidates; and
   means for determining short cut points by using the correlation between the sequential images, the correlation between the non-sequential temporally sub-sampled images and the motion amount between the sub-sampled images,
   wherein the means for measuring correlation between sequential images and the means for directly measuring correlation between only non-sequential temporally sub-sampled images operate independently from each other.

7. A picture searching apparatus according to claim 1, wherein the video data to be input includes a low frequency component of image data.

8. A picture searching apparatus according to claim 1, wherein the video data to be input includes low frequency image data obtained by partly decoding compressed image data and motion vector.

9. A picture searching apparatus according to claim 2, wherein the video data to be input includes a low frequency component of image data.

10. A picture searching apparatus according to claim 2, wherein the video data to be input includes low frequency image data obtained by partly decoding compressed image data and motion vector.

11. A picture searching apparatus according to claim 3, wherein the video data to be input includes a low frequency component of image data.

12. A picture searching apparatus according to claim 3, wherein the video data to be input includes low frequency image data obtained by partly decoding compressed image data and motion vector.

13. A picture searching apparatus according to claim 4, wherein the video data to be input includes a low frequency component of image data.

14. A picture searching apparatus according to claim 4, wherein the video data to be input includes low frequency image data obtained by partly decoding compressed image data and motion vector.

15. A picture searching apparatus according to claim 5, wherein the video data to be input includes a low frequency component of image data.

16. A picture searching apparatus according to claim 5, wherein the video data to be input includes low frequency image data obtained by partly decoding compressed image data and motion vector.

17. A picture searching apparatus according to claim 6, wherein the video data to be input includes a low frequency component of image data.

18. A picture searching apparatus according to claim 6, wherein the video data to be input includes low frequency image data obtained by partly decoding compressed image data and motion vector.

* * * * *